US009839057B2

(12) United States Patent
Guo

(10) Patent No.: US 9,839,057 B2
(45) Date of Patent: Dec. 5, 2017

(54) METHODS FOR EXCHANGING INFORMATION BETWEEN ELECTRONIC DEVICES, AND ELECTRONIC DEVICES

(75) Inventor: Xiaobing Guo, Beijing (CN)

(73) Assignees: Beijing Lenovo Software Ltd., Beijing (CN); Lenovo (Beijing) Limited, Beijing (CN)

(*) Notice: Subject to any disclaimer, the term of this patent is extended or adjusted under 35 U.S.C. 154(b) by 237 days.

(21) Appl. No.: 13/976,735

(22) PCT Filed: Dec. 27, 2011

(86) PCT No.: PCT/CN2011/084727
§ 371 (c)(1),
(2), (4) Date: Jun. 27, 2013

(87) PCT Pub. No.: WO2012/089099
PCT Pub. Date: Jul. 5, 2012

(65) Prior Publication Data
US 2013/0273842 A1 Oct. 17, 2013

(30) Foreign Application Priority Data
Dec. 28, 2010 (CN) .......................... 2010 1 0622553

(51) Int. Cl.
H04W 76/02 (2009.01)
H04M 1/725 (2006.01)
(52) U.S. Cl.
CPC ....... H04W 76/023 (2013.01); H04M 1/7253 (2013.01); H04M 2250/22 (2013.01); H04M 2250/64 (2013.01)
(58) Field of Classification Search
CPC ......... H04M 2250/64; H04M 2250/22; H04M 1/7253; H04W 76/023
See application file for complete search history.

(56) References Cited

U.S. PATENT DOCUMENTS 6,313,853 B1 * 11/2001 Lamontagne ......... G06F 9/4443
345/156
6,580,704 B1 * 6/2003 Wellig .............. H04L 29/12009
370/338

(Continued)

FOREIGN PATENT DOCUMENTS

CN 1638526 A 7/2005
CN 1972145 A 5/2007

(Continued)

OTHER PUBLICATIONS

"International Application Serial No. PCT/CN2011/084727, International Search Report dated Apr. 5, 2012", (w/ English Translation), 5 pgs.

(Continued)

Primary Examiner — Gennadiy Tsvey
(74) Attorney, Agent, or Firm — Schwegman Lundberg & Woessner, P.A.

(57) ABSTRACT

The present disclosure provides a method for exchanging information between electronic devices, and an electronic device. The method includes at a first electronic device: determining that a request for exchanging information from a second electronic device is valid, after receiving the request; acquiring an information area with respect to the request, and selecting area data corresponding to the information area; and after or at the same time of the selection of the area data, establishing a communication connection with the second electronic device, and transmitting the area data over the communication connection. After coming into contact with the second electronic device, the electronic device equipped with the touch screen, as the first electronic device, may establish and perform data transmission with the second electronic device. Compared with the conventional methods that require transmission via mobile communication or 3G communication, the present disclosure can (Continued)

reduce cost for the user of the electronic device, and provide more diversified services and higher transmission bandwidth.

6 Claims, 4 Drawing Sheets

(56) References Cited

U.S. PATENT DOCUMENTS

| | | | |
|---|---|---|---|
| 6,639,584 B1* | 10/2003 | Li | H04M 1/72519 178/18.01 |
| 6,943,778 B1* | 9/2005 | Astala et al. | 345/173 |
| 7,884,805 B2 | 2/2011 | Thorn | |
| 7,970,350 B2* | 6/2011 | Sheynman | H04W 8/005 370/259 |
| 8,219,028 B1* | 7/2012 | Flamholz | G06F 1/1694 455/41.2 |
| 8,391,786 B2* | 3/2013 | Hodges | G06F 1/1626 455/3.01 |
| 2002/0193080 A1* | 12/2002 | Komsi | G06F 3/0233 455/575.1 |
| 2003/0103091 A1* | 6/2003 | Wong | G06F 1/1626 715/863 |
| 2003/0162556 A1* | 8/2003 | Libes | H04W 76/023 455/507 |
| 2005/0093868 A1* | 5/2005 | Hinckley | G06F 3/011 345/502 |
| 2005/0141546 A1 | 6/2005 | Heo | |
| 2005/0198029 A1* | 9/2005 | Pohja | H04M 1/7253 |
| 2005/0212749 A1* | 9/2005 | Marvit | G06F 1/1613 345/156 |
| 2005/0212750 A1* | 9/2005 | Marvit | G06F 1/1613 345/156 |
| 2005/0226183 A1* | 10/2005 | Penumetsa | H04W 76/023 370/329 |
| 2006/0092866 A1* | 5/2006 | Kim | G06F 1/1626 370/310 |
| 2006/0146765 A1* | 7/2006 | Van De Sluis | G06F 3/016 370/338 |
| 2006/0256074 A1* | 11/2006 | Krum | G06F 1/1626 345/156 |
| 2007/0124503 A1* | 5/2007 | Ramos | G06F 3/017 709/248 |
| 2007/0146347 A1* | 6/2007 | Rosenberg | G06F 3/04883 345/173 |
| 2007/0157101 A1* | 7/2007 | Indiran | H04L 67/36 715/769 |
| 2007/0188323 A1* | 8/2007 | Sinclair | G06F 21/445 340/568.1 |
| 2008/0036743 A1* | 2/2008 | Westerman | G06F 3/038 345/173 |
| 2008/0039212 A1* | 2/2008 | Ahlgren | H04M 1/7253 463/46 |
| 2008/0143685 A1* | 6/2008 | Lee | G06F 17/30017 345/173 |
| 2008/0152263 A1* | 6/2008 | Harrison | G06F 1/1626 382/313 |
| 2008/0231610 A1* | 9/2008 | Hotelling | G06F 3/0418 345/173 |
| 2008/0259042 A1* | 10/2008 | Thorn | G06F 3/04883 345/173 |
| 2009/0017799 A1* | 1/2009 | Thorn | G06F 3/017 455/414.1 |
| 2009/0153342 A1* | 6/2009 | Thorn | 340/669 |
| 2009/0156251 A1 | 6/2009 | Cannistraro | |
| 2010/0138743 A1* | 6/2010 | Chou | G06F 3/0486 715/702 |
| 2010/0167646 A1* | 7/2010 | Alameh | G06F 3/017 455/41.2 |
| 2010/0299390 A1* | 11/2010 | Alameh | G06F 3/017 709/204 |
| 2011/0081923 A1* | 4/2011 | Forutanpour | G06F 1/1694 455/457 |
| 2011/0083111 A1* | 4/2011 | Forutanpour | G06F 1/1694 715/863 |
| 2011/0154014 A1* | 6/2011 | Thorn | H04M 1/7253 713/150 |
| 2011/0162048 A1* | 6/2011 | Bilbrey | H04W 8/005 726/4 |
| 2012/0062442 A1* | 3/2012 | Locker | G06F 3/1446 345/1.3 |
| 2012/0077436 A1* | 3/2012 | Konded et al. | 455/41.2 |

FOREIGN PATENT DOCUMENTS

| | | |
|---|---|---|
| CN | 101641672 A | 2/2010 |
| CN | 101896949 A | 11/2010 |
| WO | WO-2010123204 A2 | 10/2010 |

OTHER PUBLICATIONS

"International Application Serial No. PCT/CN2011/084727, Written Opinion dated Apr. 5, 2012", 4 pgs.

* cited by examiner

METHODS FOR EXCHANGING INFORMATION BETWEEN ELECTRONIC DEVICES, AND ELECTRONIC DEVICES

This application is a U.S. National Stage Application filed under 35 U.S.C §371 of International Application Serial No. PCT/CN2011/084727, filed on Dec. 27, 2011 and published as WO 2012/089099 A1 on Jul. 5, 2012 which application claims priority to Chinese Application No. 201010622553.2, filed on Dec. 28, 2010, both of which applications and publication are incorporated herein by reference in their entireties.

TECHNICAL FIELD

The present disclosure relates to communication technology, and more particularly to methods for exchanging information between electronic devices, and such electronic devices.

BACKGROUND

The $3^{rd}$ generation (3G) mobile communication technology refers to cellular mobile communication technology supporting high-speed data transmission. The 3G service can transmit sound and data information simultaneously at a rate typically above several hundred kbps. The major difference of 3G from 2G is an increase in speed for transmitting sound and data. The 3G system can enable better wireless roaming in a global scope, processing various forms of media, such as image, music, and video stream, and providing various information services, such as webpage browse, teleconference, and e-commerce, by taking into account good compatibility with the existing 2G system. To this end, wireless networks should be able to support different data transmission speed, for example, supporting transmission speeds of at least 2 Mbps (Megabit per second), 384 kbps (kilobit per second), and 144 kbps for indoors, outdoors, and driving condition, respectively. (These values will vary depending on network environment).

Conventionally, data transmission is performed with network resources provided by the 3G technology. The data transmission with the existing network resources will add to a user's payment, and network congestion often occurs due to the limited existing network resources.

There is a need for methods for exchanging information between electronic devices and such electronic devices, which can reduce cost for the user of the electronic device, and provide more diversified services and higher transmission bandwidth.

SUMMARY

An embodiment of the present disclosure provides a method for exchanging information between electronic devices, including, at a first electronic device: determining that a request for exchanging information from a second electronic device is valid, after receiving the request; acquiring an information area with respect to the request, and selecting area data corresponding to the information area; and after or at the same time of the selection of the area data, establishing a communication connection with the second electronic device, and transmitting the area data over the communication connection.

An embodiment of the present disclosure provides an electronic device including: a detection unit configured to determine that a request for exchanging information from a second electronic device is valid, after the electronic device receives the request; a data selection unit configured to acquiring an information area with respect to the request, and select area data corresponding to the information area; and a communication connection unit configured to, after or at the same time of the selection of the area data, establish a communication connection with the second electronic device, and transmit the area data over the communication connection.

According to embodiments of the present disclosure, data transmission can be performed between an electronic device equipped with a touch screen, as a first electronic device, and a second electronic device, after the first and second electronic devices come into contact with each other. Compared with the conventional methods that require transmission via mobile communication or 3G communication, the present disclosure can reduce cost for the user of the electronic device, and provide more diversified services and higher transmission bandwidth.

DETAILED DESCRIPTION OF THE EMBODIMENTS

The present disclosure will be detailed below with reference to the figures and embodiments, to further illustrate the problems to be solved by the present disclosure, the solutions and advantages of the present disclosure.

Figure 1:
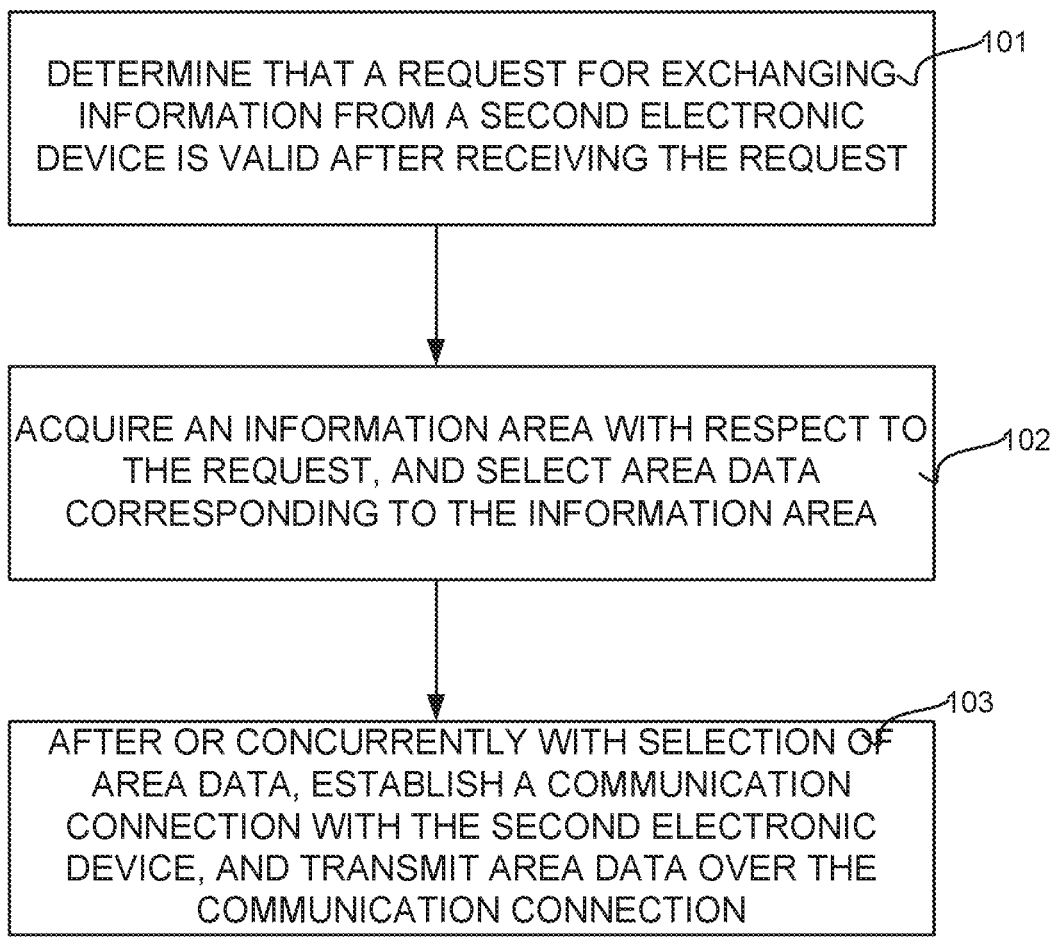
FIG. 1 is a schematic flowchart of a method for exchanging information between electronic devices according to an embodiment of the present disclosure.
Figure 2:
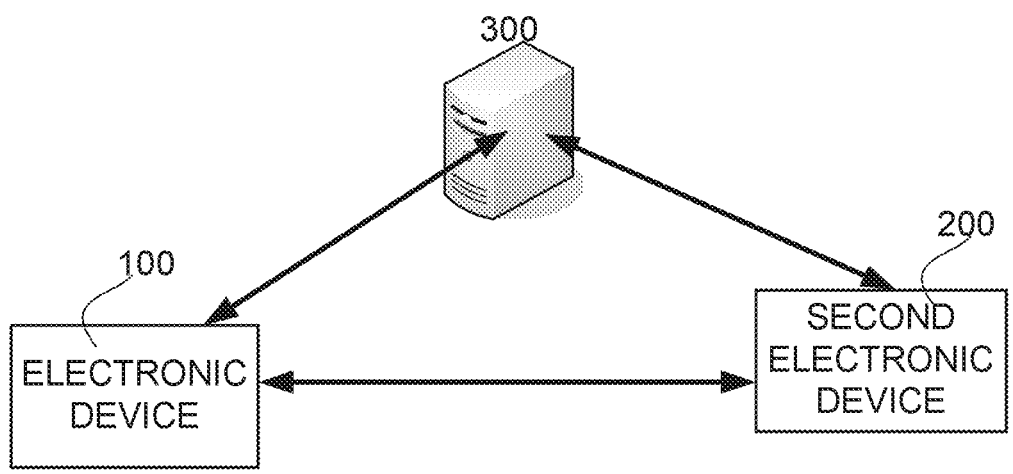
FIG. 2 is a schematic diagram showing establishment of communication connection between electronic devices according to an embodiment of the present disclosure.
Figure 3:
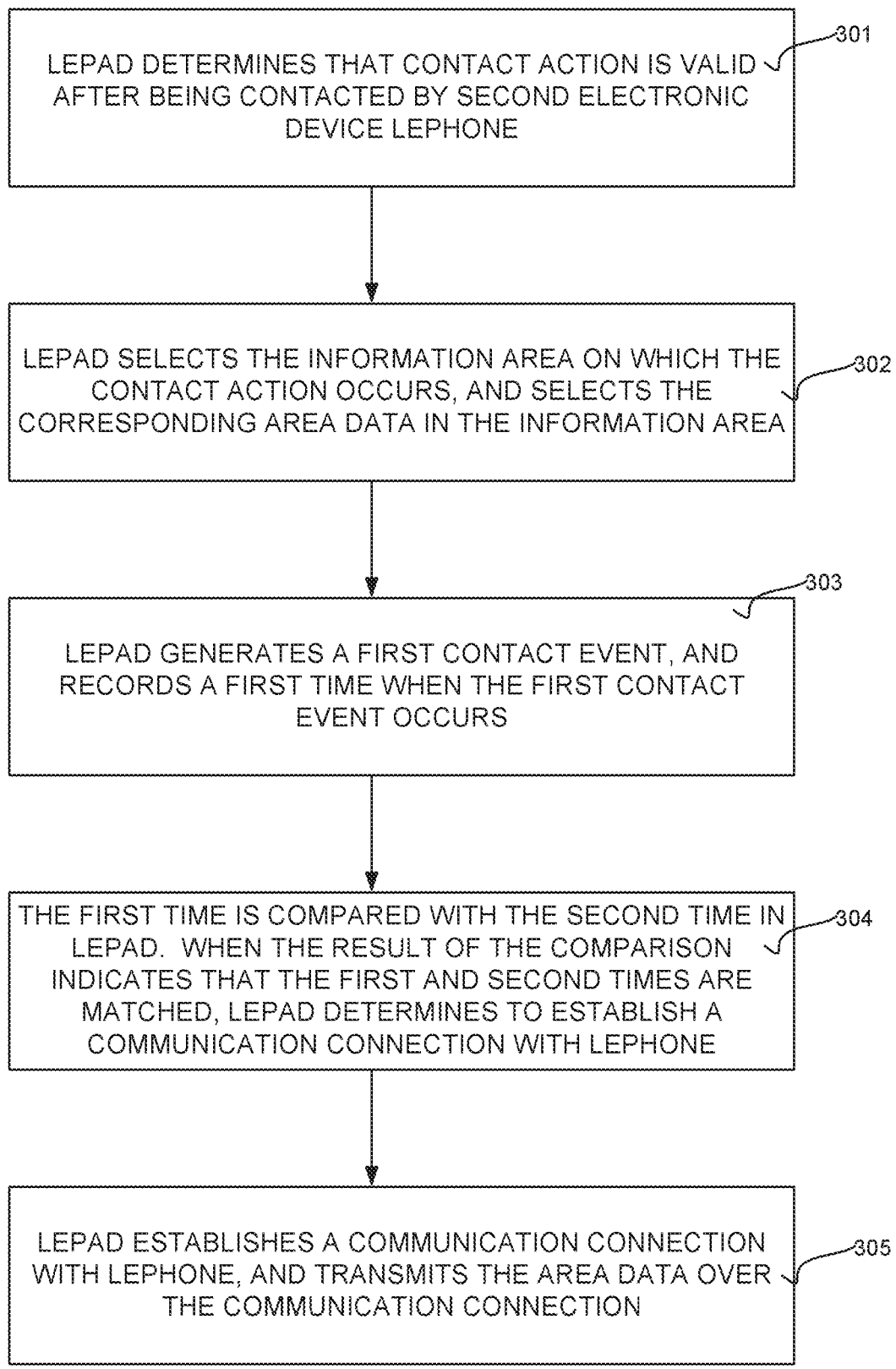
FIG. 3 is a schematic flowchart of showing establishment of communication connection between LePad and LePhone according to an embodiment of the present disclosure.
Figure 4:
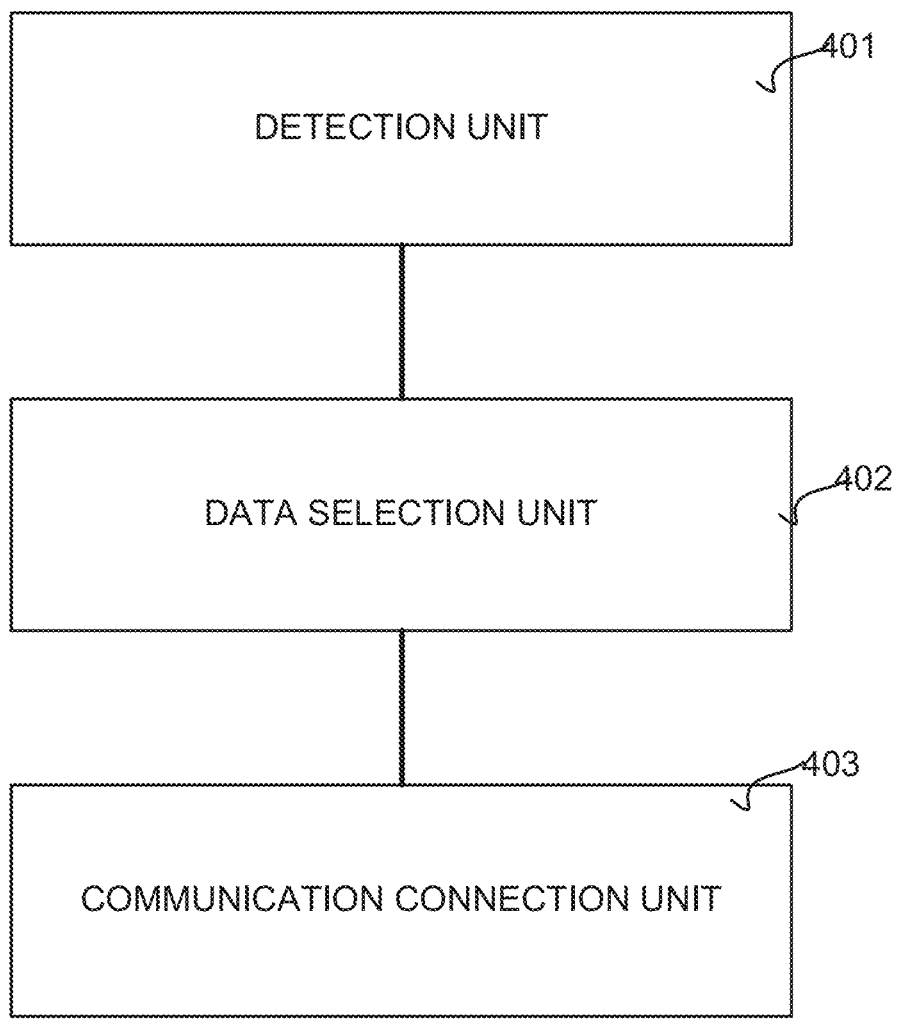
FIG. 4 is a schematic block diagram of an electronic device according to an embodiment of the present disclosure.

An embodiment of the present disclosure provides a method for exchanging information between electronic devices. As shown in FIGS. 1 and 2, the method includes the following steps.

Step 101, an electronic device 100 equipped with a touch screen determines that a request for exchanging information from a second electronic device 200 is valid, after receiving the request.

Step 102, the electronic device 100 acquires an information area with respect to the request, and selects area data corresponding to the information area.

Step 103, after or at the same time of the selection of the area data, the electronic device 100 establishes a communication connection with the second electronic device 200, and transmits the area data over the communication connection.

The request for exchanging information may correspond to a contact with the second electronic device 200. After coming into contact with the second electronic device 200, the electronic device 100 equipped with the touch screen, as the first electronic device, may establish and perform data transmission with the second electronic device 200. Compared with the conventional methods that require transmission via mobile communication or 3G communication, the present disclosure can reduce cost for the user of the electronic device, and provide more diversified services and higher transmission bandwidth.

The communication connection with the second electronic device 200 may be established by establishing, as the communication connection, a point-to-point network connection with the second electronic device 200.

Alternatively, a first network communication may be established with a server 300 which has a second network connection with the second electronic device 200. The first and second network connections form the communication connection.

As shown in FIG. 2, the communication connection between the electronic device 100 and the second electronic device 200 may be implemented in various manners. With the popularization of wireless technologies such as WiFi, and Bluetooth, most of the existing electronic devices have wireless technology related functions. As a result, it is possible to establish communication connection between two electronic devices or among more than two electronic devices.

The electronic device as a communication terminal can support transmission of various data over communication networks, communicate with a base station (which may be referred to as a server), and establish communication connection with a core network (which may be referred to as another server) via the base station.

The electronic devices can establish connection with each other via a wireless Access Point (AP). Here, the wireless AP may be referred to as a server via which the electronic device can establish communication connection with the second electronic device 200.

It is necessary to determine that data transmission between the two electronic devices is actually required before establishing the communication connection. Accordingly, when the electronic devices come into contact, the first electronic device 100 corresponding to the second electronic device 200 generates a first event of information exchange request, and records a first time when the first event is generated.

The second electronic device 200 generates a second event of information exchange request and a touch event, and records a second time when the second event and the touch event are generated. Here, the touch event refers to an event generated when a touch action is performed on the touch screen of the second electronic device 200.

The first time and the second time are compared. When the result of the comparison indicates that the first and second times are matched, it is determined that a communication connection needs to be established between the electronic device 100 and the second electronic device 200.

The request for exchanging information may correspond to a condition that at least one contact action occurs, and the contact action is valid. Alternatively, the request for exchanging information may correspond to a condition that a trigger operation is performed on a predetermined component of the second electronic device 200, and the trigger operation is valid. Alternatively, the request for exchanging information may correspond to an electronic signal from the second electronic device 200. Particularly, the event of information exchange request may be a contact event. In an embodiment, whether a communication connection needs to be established between the electronic devices may be determined in the following manner. Before establishing a communication connection between the first and second electronic devices, the first electronic device generates a first contact event, and records a first time when the first contact event occurs. The second electronic device 200 generates a second contact event and a touch event, and records a second time when the second contact event and the touch event occur. Here, the touch event refers to an event generated when a touch action is performed on the touch screen of the second electronic device 200. The first time and the second time are compared. When the result of the comparison indicates that the first and second times are matched, it is determined that a communication connection needs to be established between the electronic device and the second electronic device 200.

Alternatively, before establishing the communication connection with the second electronic device 200, the electronic device 100 may broadcast its own identification number wirelessly, and wait for a response information containing a request for establishing a communication connection from the second electronic device 200.

The contact action may be determined as valid when at least one contact action is applied to the electronic device 100, and the pressure exerted by the contact action on a resistive touch screen of the electronic device 100 reaches a preset value. In practical applications, it may be prescribed that a contact action is valid only when it occurs two or more times, in order to ensure that the contact action actually takes effect.

The step of selecting area data corresponding to the information area may be performed in the following manner.

There are currently a plurality of information areas on the touch screen, and each of the information areas has corresponding area data. When a valid contact action occurs on one of the information areas, the area data contained in the information area is acquired. Alternatively, after a valid contact action occurs on one of the information areas, the area data that are selected within a predetermined time period before or after the occurrence of the valid contact action are acquired.

In an application scenario, the electronic device may be implemented as a LePad, and the second electronic device may be implemented as a LePhone. The two devices may exchange information as follows.

Step 301, the LePad determines that the contact action is valid after being contacted by the second electronic device, LePhone. In this process, some hot key of the LePad may be pressed to bring the LePad into an information exchange state, and then certain position of the LePad may be brought into contact with the touch screen of the LePhone. Also, the contact action may be determined as valid when it occurs two or more times.

Step 302, the LePad selects the information area on which the contact action occurs, and selects the corresponding area data in the information area.

Step 303, the LePad generates a first contact event, and records a first time when the first contact event occurs.

At this time, the LePhone also generates a second contact event and a touch event, and records a second time when the second contact event and the touch event occur. Here, the touch event may refer to an event generated when the touch screen of the LePhone is touched.

Step 304, the first time is compared with the second time in the LePad. When the result of the comparison indicates that the first and second times are matched, the LePad determines to establish a communication connection with the LePhone.

At the same time, the first time is compared with the second time in the LePhone. When the result of the comparison indicates that the first and second times are matched, the LePhone determines to establish a communication connection with the LePad.

Step 305, the LePad establishes a communication connection with the LePhone, and transmits the area data over the communication connection.

Here, the LePad may negotiate with the LePhone to establish the communication connection via wireless technologies, such as WiFi or Bluetooth, or by establishing a communication with a core network via a base station of a communication network, or via wireless APs.

An embodiment of the present disclosure provides an electronic device including: a detection unit 401 configured to determine that a request for exchanging information from a second electronic device 200 is valid, after the electronic device receives the request; a data selection unit 402 configured to acquiring an information area with respect to the request, and select area data corresponding to the information area; and a communication connection unit 403 configured to, after or at the same time of the selection of the area data, establish a communication connection with the second electronic device 200, and transmit the area data over the communication connection.

After coming into contact with the second electronic device 200, the electronic device 100 equipped with the touch screen, as the first electronic device, may establish and perform data transmission with the second electronic device 200. Compared with the conventional methods that require transmission via mobile communication or 3G communication, the present disclosure can reduce cost for the user of the electronic device, and provide more diversified services and higher transmission bandwidth.

The communication connection unit 403 may include a point-to-point connection module configured to establish, as the communication connection, a point-to-point network connection with the second electronic device 200.

Alternatively, the communication connection unit 403 may include a network connection module configured to establish a first network connection with a server which has a second network connection with the second electronic device 200. The first and second network connections form the communication connection.

The request for exchanging information may correspond to a condition that at least one contact action occurs, and the contact action is valid. Alternatively, the request for exchanging information may correspond to a condition that a trigger operation is performed on a predetermined component of the second electronic device 200, and the trigger operation is valid. Alternatively, the request for exchanging information may correspond to an electronic signal from the second electronic device 200. Accordingly, the detection unit 401 may include a valid contact module configured to, upon at least one contact action on the electronic device 100, determine that the pressure exerted by the contact action on the resistive touch screen of the electronic device reaches a preset value.

The data selection unit 402 may include a selection execution module configured to, when at least one contact action occurs on the electronic device 100, and the valid contact action is particularly performed on one of the information areas on the touch screen, acquire area data contained in the information area. Alternatively, the selection execution module may be configured to, after a valid contact action occurs on one of the information areas, acquire area data that are selected within a predetermined time period before or after the occurrence of the valid contact action. Here, there are currently a plurality of information areas on the touch screen, and each of the information areas has corresponding area data.

According to an embodiment, it is necessary to determine that data transmission between the two electronic devices is actually required before establishing the communication connection. Accordingly, the electronic device 100 may further include an information exchange request event unit configured to, before the establishment of the communication connection with the second electronic device 200, generate a first event of information exchange request, records a first time when the first event is generated, compare the first time with a second time, and determine to establish a communication connection between the electronic device 100 and the second electronic device 200 when the result of the comparison indicates that the first and second times are matched. Here, the second time is obtained by the second electronic device 200 generating a second event of information exchange request and a touch event, and recording a second time when the second event and the touch event are generated. The touch event refers to an event generated when a touch action is performed on the touch screen of the second electronic device 200.

The foregoing illustrates several preferred embodiments of the present disclosure. To be noted, modifications and refinements can be made by those skilled in the art without departing from the principle of the present disclosure. These modifications and refinements are to be encompassed by the scope of the present disclosure.

What is claimed is:

1. A method for exchanging information between electronic devices, comprising at a first electronic device:
   determining that a request for exchanging information from a second electronic device is valid, after receiving the request;
   in response to the request for exchanging information from the second electronic device, automatically acquiring an information area with respect to the request, and selecting area data corresponding to the information area;
   generating, by the first electronic device, a first event of information exchange request, and recording a first time when the first event occurs;
   comparing the first time with a second time, and determining to establish a communication connection between the first and second electronic devices when the result of the comparison indicates that the first and second times are matched, wherein the second time is obtained by the second electronic device generating a second event of information exchange request and a touch event, and recording a second time when the second event and the touch even are generated, and wherein the touch event refers to an event generated when a touch action is performed on a touch screen of the second electronic device; and
   in response to the selection of the area data, establishing a communication connection with the second electronic device, and transmitting the area data over the communication connection, wherein establishing a communication connection with the second electronic device comprises establishing a first network connection with a server that has a second network connection with the second electronic device, wherein the first and second network connections form the communication connection,
   wherein the request for exchanging information corresponds to a condition that a contact action from the second electronic device against the first electronic device occurs, and the contact action is valid;

and wherein the first electronic device is provided with a touch screen on which there are a plurality of information areas, and selecting area data corresponding to the information area comprises:
when the valid contact action from the second electronic device against the first electronic device is applied to one information area of the information areas on the touch screen of the first electronic device, automatically acquiring area data contained in that one information area.

2. The method of claim 1, wherein determining that the contact action is valid comprises:
determining that the contact action is applied to the first electronic device, and a pressure exerted by the contact action on a touch screen of the first electronic device reaches a preset value.

3. The method of claim 1, wherein selecting area data corresponding to the information area comprises:
after the valid contact action from the second electronic device is applied to one information area of the information areas, acquiring area data that are selected within a predetermined time period before or after occurrence of the valid contact action.

4. An electronic device comprising:
a detection unit configured to determine that a request for exchanging information from a second electronic device is valid, after the electronic device receives the request;
a data selection unit configured to automatically acquire an information area with respect to the request, and select area data corresponding to the information area in response to the request for exchanging information from the second electronic device;
an information exchange request event unit configured to, before establishment of a communication connection with the second electronic device, generate a first event of information exchange request, record a first time when the first event is generated; and compare the first time with a second time, and determine to establish a communication connection between the electronic device and the second electronic device when the result of the comparison indicates that the first and second times are matched; wherein the second time is obtained by the second electronic device generating a second event of information exchange request and a touch event, and recording a second time when the second event and the touch even are generated, and wherein the touch event refers to an event generated when a touch action is performed on a touch screen of the second electronic device; and
a communication connection unit configured to, after or at the same time of the selection of the area data, establish a communication connection with the second electronic device, and transmit the area data over the communication connection, wherein the communication connection unit comprises a network connection module configured to establish a first network connection with a server which has a second network connection with the second electronic device, wherein the first and second network connections form the communication connection,
wherein the electronic device is provided with a touch screen on which there are a plurality of information areas,
wherein the request for exchanging information corresponds to a condition that a contact action from the second electronic device against the electronic device occurs, and the contact action is valid,
the data selection unit comprises a selection execution module configured to, when the valid contact action is particularly performed on one of the information areas on the touch screen of the electronic device, automatically acquire area data contained in that one information area, as the area data corresponding to the information area.

5. The electronic device of claim 4, wherein the data selection unit comprises a selection execution module configured to, after the valid contact action from the second electric device occurs on one of the information areas, acquire area data that are selected within a predetermined time period before or after the occurrence of the valid contact action.

6. An electronic device comprising:
a detection circuit configured to determine that a request for exchanging information from a second electronic device is valid, after the electronic device receives the request;
a data selection circuit configured to automatically acquire an information area with respect to the request, and select area data corresponding to the information area in response to the request for exchanging information from the second electronic device;
an information exchange request event circuit configured to, before establishment of a communication connection with the second electronic device, generate a first event of information exchange request record a first time when the first event is generated; and compare the first time with a second time, and determine to establish a communication connection between the electronic device and the second electronic device when the result of the comparison indicates that the first and second times are matched; wherein the second time is obtained by the second electronic device generating a second event of information exchange request and a touch event, and recording a second time when the second event and the touch even are generated, and wherein the touch event refers to an event generated when a touch action is performed on a touch screen of the second electronic device; and
a communication connection circuit configured to, after or at the same time of the selection of the area data, establish a communication connection with the second electronic device, and transmit the area data over the communication connection, wherein the communication connection circuit comprises a network connection module configured to establish a first network connection with a server which has a second network connection with the second electronic device, wherein the first and second network connections form the communication connection,
wherein the electronic device is provided with a touch screen on which there are a plurality of information areas,
wherein the request for exchanging information corresponds to a condition that a contact action from the second electronic device against the electronic device occurs, and the contact action is valid, the data selection circuit comprises a selection execution module configured to,
when the valid contact action is particularly performed on one of the information areas on the touch screen of the electronic device, automatically acquire area data contained in that one information area, as the area data corresponding to the information area.

\* \* \* \* \*